United States Patent [19]

Batzar

[11] Patent Number: 5,718,963
[45] Date of Patent: Feb. 17, 1998

[54] COOKWARE WITH SMOOTH-ROUGH PATTERN

[75] Inventor: Kenneth Batzar, Cherry Hill, N.J.

[73] Assignee: E. I. du Pont de Nemours and Company, Wilmington, Del.

[21] Appl. No.: 724,433

[22] Filed: Oct. 1, 1996

Related U.S. Application Data

[63] Continuation of Ser. No. 476,931, Jun. 7, 1995, abandoned, which is a continuation-in-part of Ser. No. 362,300, Dec. 22, 1994, abandoned.

[51] Int. Cl.$^6$ .................................................. B32B 3/30
[52] U.S. Cl. .................... 428/141; 428/207; 428/210; 428/324; 428/195
[58] Field of Search .................................. 428/144, 149, 428/172, 195, 207, 210, 324, 141; 427/274, 275, 299, 327

[56] References Cited

U.S. PATENT DOCUMENTS

| | | | |
|---|---|---|---|
| 3,087,827 | 4/1963 | Klenke et al. | 106/291 |
| 3,087,828 | 4/1963 | Linton | 106/291 |
| 3,087,829 | 4/1963 | Linton | 106/291 |
| 3,655,421 | 4/1972 | Long | 117/45 |
| 4,126,727 | 11/1978 | Kaminski | 428/324 |
| 4,169,083 | 9/1979 | Vassiliou | 260/23 |
| 4,259,375 | 3/1981 | Vassiliou | 427/267 |
| 4,311,634 | 1/1982 | Vassiliou | 260/42.27 |
| 4,677,000 | 6/1987 | Gardaz et al. | 427/261 |
| 4,711,802 | 12/1987 | Tannenbaum | 428/207 |
| 5,233,358 | 8/1993 | Yamada et al. | 430/18 |

FOREIGN PATENT DOCUMENTS

| | | |
|---|---|---|
| 285 161 | 2/1992 | European Pat. Off. . |
| 568322 | 4/1993 | European Pat. Off. . |
| 2 594 673-A3 | 8/1987 | France . |
| 1 572 842 | 8/1980 | United Kingdom . |
| 2 174 315A | 11/1986 | United Kingdom . |

*Primary Examiner*—Alexander Thomas

[57] ABSTRACT

An article of cookware is provided with a cooking surface in which a pattern is made by different levels of roughness. A non-stick coating has mica that orients preferentially over the smoother areas of the substrate and randomly over the rougher areas of the substrate.

9 Claims, No Drawings

COOKWARE WITH SMOOTH-ROUGH PATTERN

CROSS REFERENCE TO RELATED APPLICATIONS

This is a continuation of application Ser. No. 08/476,931 filed Jun. 7, 1995, now abandoned, which is a continuation-in-part of application Ser. No. 08/362,300, filed Dec. 22, 1994, now abandoned.

BACKGROUND OF THE INVENTION

In the cookware industry, there are several initiatives in forming high-low patterns on the cooking surface, including concentric circles of raised and recessed patterns, waffle patterns and others. There are also older patents on providing a rough underlayer, such as ceramic frits or flame sprayed metal, which telegraph partially or completely or protrude through a non-stick coating. One theory is that high-low profile of the underlayer or substrate will provide safe areas for the coating so that if the coating is removed from the peaks by a cooking instrument, the rest of the coating in the valleys will remain functional.

Means for providing further aesthetic and functional flexibility are needed.

SUMMARY OF THE INVENTION

The present invention provides an article of cookware having a multilayer, non-stick coating which exhibits a pattern, said cookware having a cooking surface comprising a substrate, a primer coating layer on and adhered to the substrate, and at least one non-stick coating layer on and adhered to the primer coating, wherein a pattern is present on the substrate in the form of areas having at least two different levels of roughness, and at least one non-stick coating which contains from 0.5 to 1.5% by weight, based on the solids content of the coating, of oxide-coated mica, and wherein the differences in the levels of roughness are enough to cause the mica to orient preferentially over smoother areas of the substrate and randomly over rougher areas of the substrate to form a visible pattern.

DETAILED DESCRIPTION.

It has been found that mica flakes will "flop" or orient preferentially, preferably parallel to the substrate, in a coating as it cures over a smoother substrate, while it will give a random orientation over a rougher substrate. This gives a visible difference that can be used to provide a pattern for aesthetic and functional purposes. The patterned roughness of the substrate can be obtained by grit or sand blasting through a mask or in patterns or by using an embossed die to impress the smooth-rough pattern on the surface of the cookware. The pattern is more visible when the mica used has a coating, preferably of $TiO_2$ as is known in its art, to give an opalescent, pearlescent or sparkling appearance, as described in U.S. Pat. Nos. 3,037,827—Klenke et al., 3,087,828 and 3,087,829—both to Linton, all granted in 1963.

The substrate can comprise metal, glass or ceramic. An example of a metal substrate is aluminum or an aluminum-based alloy having at least 50% by weight aluminum.

Preferably the invention is used with fluoropolymer coatings as described in U.S. Pat. No. 4,353,950—Vassiliou (1982) and the references named therein, all incorporated herein by reference.

With the disclosure above, those skilled in the art will know fully how to practice the invention.

EXAMPLE

A mask is produced to form a design so that grit blasting the interior of a piece of aluminum cookware will leave a rough pattern through the holes in the mask, and leave the metal smooth where the mask is solid. A preferred level is 0–20 microinches RMS measured as an arithmetic average from a centerline by a Model RT-60 profilometer made by Alpa Co. of Milan, Italy, for the smooth area and >200 microinches for the toughened area.

To the design created by blasting the metal, a primer (A) is adhered, (7.5–10.0 microns thick) the primer is dried at 115° C. for three minutes and a midcoat (B) applied (17.5–20.0 microns) containing 1–5% $TiO_2$ coated mica, specifically 2½% mica. This is followed by a topcoat system (7.5–10.0 microns) containing $TiO_2$ coated mica. Coating thicknesses herein are given in resulting dry film thicknesses (DFT). The coating system is heated at 427° C. for 5 minutes to produce a coating that not only telegraphs the design from the substrate, but enhances the design by orienting the flake over the smooth substrate areas so that a "flop" effect is seen. The primer, intermediate and topcoat compositions given in Tables 1, 2, and 3 were used.

TABLE 1

| Primer | Coating Composition Wt. % | Final Wt. % Based on Solids Content |
|---|---|---|
| Furfuryl Alcohol | 1.82 | — |
| Polyamic acid salt in N-Methyl Pyrrolidone | 18.10 | 24.48 |
| Water | 48.33 | — |
| Mica coated with $TiO_2$ | 0.05 | 0.24 |
| PTFE Dispersion | 7.93 | 22.19 |
| FEP Dispersion | 5.88 | 15.08 |
| Colloidal Silica Dispersion | 3.58 | 5.00 |
| Ultramarine blue dispersion | 13.74 | 32.06 |
| Aluminum silicate dispersion | 0.58 | 0.94 |

TABLE 2

| Intermediate | Coating Composition Wt. % | Final Wt. % Based on Solids Content |
|---|---|---|
| PTFE Dispersion | 56.34 | 77.43 |
| PFA Dispersion | 10.21 | 14.22 |
| Water | 4.62 | — |
| Carbon black dispersion | 2.71 | 3.79 |
| Ultramarine blue dispersion | 0.49 | 3.22 |
| Mica coated with $TiO_2$ | 0.75 | 1.73 |
| Surfactant catalyst soln. | 12.63 | — |
| Acrylic dispersion | 12.23 | — |

TABLE 3

| Topcoat | Coating Composition Wt. % | Final Wt. % Based on Solids Content |
|---|---|---|
| PTFE Dispersion | 66.73 | 94.04 |
| PFA Dispersion | 3.51 | 4.95 |
| Water | 3.77 | — |
| Mica coated with $TiO_2$ | 0.43 | 1.01 |
| Surfactant catalyst soln. | 12.52 | — |
| Acrylic dispersion | 13.04 | — |

I claim:

1. An article of cookware having a multilayer, non-stick coating which exhibits a pattern, said cookware having a cooking surface comprising a substrate, a primer coating layer on and adhered to the substrate, and at least one non-stick coating layer on and adhered to the primer coating, wherein a pattern is present on the substrate in the form of areas having at least two different levels of roughness, and at least one non-stick coating which contains from 0.5 to 1.5% by weight, based on the solids content of the coating, of oxide-coated mica, and wherein the differences in the levels of roughness are enough to cause the mica to orient preferentially over smoother areas of the substrate and randomly over rougher areas of the substrate to form a visible pattern.

2. The article of claim 1 in which the coating has a sparkling appearance over the smoother areas.

3. The article of claim 1 in which the mica has a coating of $TiO_2$.

4. The article of claim 1 in which the substrate is metal, glass or ceramic.

5. The article of claim 4 in which the substrate is aluminum or an aluminum-based alloy having at least 50% by weight aluminum.

6. The article of claim 1 in which the roughening is done by impingement of abrasive media.

7. The article of claim 1 in which the toughening is done by impressing the substrate with a die in which the roughness differential pattern is present.

8. The article of claim 1 in which the coating comprises a primer and one non-stick layer.

9. The article of claim 1 in which the coating comprises a primer, an intermediate coat, and a non-stick coat.

* * * * *